United States Patent
Lu et al.

(10) Patent No.: US 10,494,521 B2
(45) Date of Patent: Dec. 3, 2019

(54) BIODEGRADABLE POLYESTER COMPOSITION

(71) Applicants: KINGFA SCI. & TECH. CO., LTD., Guangdong (CN); ZHUHAI WANGO CHEMICAL CO., LTD., Guangdong (CN); TIANJIN KINGFA NEW MATERIAL CO., LTD., Tianjin (CN)

(72) Inventors: Changli Lu, Guangdong (CN); Zhimin Yuan, Guangdong (CN); Tongmin Cai, Guangdong (CN); Xianbo Huang, Guangdong (CN); Xiangbin Zeng, Guangdong (CN); Jian Jiao, Guangdong (CN); Renxu Yuan, Guangdong (CN); Yuke Zhong, Guangdong (CN); Kai Xiong, Guangdong (CN); Hui Yang, Guangdong (CN); Kaijin Mai, Guangdong (CN); Xueteng Dong, Guangdong (CN)

(73) Assignees: KINGFA SCI. & TECH. CO., LTD., Guangdong (CN); ZHUHAI WANGO CHEMICAL CO., LTD., Guangdong (CN); TIANJIN KINGFA NEW MATERIAL CO., LTD., Tianjin (CN)

( * ) Notice: Subject to any disclaimer, the term of this patent is extended or adjusted under 35 U.S.C. 154(b) by 159 days.

(21) Appl. No.: 15/578,683

(22) PCT Filed: Feb. 24, 2017

(86) PCT No.: PCT/CN2017/074676
§ 371 (c)(1),
(2) Date: Nov. 30, 2017

(87) PCT Pub. No.: WO2017/152774
PCT Pub. Date: Sep. 14, 2017

(65) Prior Publication Data
US 2018/0163044 A1    Jun. 14, 2018

(30) Foreign Application Priority Data

Mar. 7, 2016    (CN) .......................... 2016 1 0126866

(51) Int. Cl.
| | | |
|---|---|---|
| *C08L 67/02* | (2006.01) | |
| *C08G 59/17* | (2006.01) | |
| *C08K 5/156* | (2006.01) | |
| *C08L 3/02* | (2006.01) | |
| *C08L 67/04* | (2006.01) | |
| *C08K 13/02* | (2006.01) | |
| *C08K 5/00* | (2006.01) | |
| *C08J 5/18* | (2006.01) | |
| *C08K 5/07* | (2006.01) | |
| *C08K 3/013* | (2018.01) | |
| *C08K 5/12* | (2006.01) | |
| *C08L 25/14* | (2006.01) | |

(52) U.S. Cl.
CPC .......... *C08L 67/02* (2013.01); *C08G 59/1466* (2013.01); *C08K 5/156* (2013.01); *C08K 13/02* (2013.01); *C08L 3/02* (2013.01); *C08L 67/04* (2013.01); *C08K 5/0016* (2013.01); *C08K 5/0075* (2013.01); *C08L 2201/06* (2013.01); *C08L 2201/08* (2013.01)

(58) Field of Classification Search
None
See application file for complete search history.

(56) References Cited

U.S. PATENT DOCUMENTS

2011/0269873 A1*  11/2011  Seeliger .................. C08L 67/02
523/351

FOREIGN PATENT DOCUMENTS

| CN | 101622311 | | 1/2010 |
|---|---|---|---|
| CN | 102485765 | A * | 6/2012 |
| CN | 102639594 | | 8/2012 |

(Continued)

OTHER PUBLICATIONS

"International Search Report (Form PCT/ISA/210)", dated Jun. 1, 2017, with English translation thereof, pp. 1-4.

*Primary Examiner* — Randy P Gulakowski
*Assistant Examiner* — Ha S Nguyen
(74) *Attorney, Agent, or Firm* — JCIPRNET

(57) ABSTRACT

A biodegradable polyester composition based on a total weight of the biodegradable polyester composition, including a weight content of a cyclic ester compound having a structure shown as formula (I), which is 100 ppm-950 ppm; and based on the total weight of the biodegradable polyester composition, a weight content of cyclopentanone is 0.5 ppm-85 ppm is provided. The cyclic ester compound and cyclopentanone is added into the composition and controlling the content of the cyclic ester compound and the content of cyclopentanone in a certain range in the composition to realize an anti-thermal oxidative aging property of the biodegradable polyester composition. In addition, a film is prepared by blow molding or a part is prepared by injection molding after being digested with 95% ethanol at 40° C. for 240 hours.

(I)

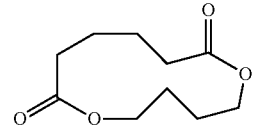

32 Claims, No Drawings

(56) References Cited

FOREIGN PATENT DOCUMENTS

| | | |
|---|---|---|
| CN | 103687902 | 3/2014 |
| CN | 104479304 | 4/2015 |
| CN | 104744898 | 7/2015 |
| CN | 105585827 | 5/2016 |
| JP | S6067550 | 4/1985 |
| WO | 2009071475 | 6/2009 |

\* cited by examiner

BIODEGRADABLE POLYESTER COMPOSITION

CROSS-REFERENCE TO RELATED APPLICATION

This application is a 371 of international application of PCT application serial no. PCT/CN2017/074676, filed on Feb. 24, 2017, which claims the priority benefit of China application no. 201610126866.6, filed on Mar. 7, 2016. The entirety of each of the abovementioned patent applications is hereby incorporated by reference herein and made a part of this specification.

TECHNICAL FIELD

The present invention belongs to a field of modification of macromolecule materials, and specifically relates to a biodegradable polyester composition with excellent anti-thermal oxidative aging property, surface appearance property and bubble stability.

BACKGROUND

Biodegradable polyester is a kind of macromolecule material using biological resources as raw materials. With respect to a petroleum-based polymer using petrochemical resources as raw materials, the biodegradable polyester can be degraded during a process of biological or biochemical effect or in a biological environment, being a very active degradable material in the present biodegradable plastic research and one of the best degradable materials in market application.

At present, biodegradable polyester film takes one of the most important application fields of biodegradable polyester, mainly including grocery bag, garbage bag, shopping bag, mulching film and the like. During blow molding process of the biodegradable polyester in preparing films, it frequently appears that the film is not lubricating enough to adhere to a roll or is too lubricating to roll up. Thus it results in poor bubble stability and large range of film thickness during film blowing which severely affect a continuity of film blowing. In CN 101622311A, by adding 0.05-5 wt % of biodiesel into a biodegradable polyester mixture, a viscosity of the polyester mixture is decreased, to some extent leading to less adherence of film to the roll, which guarantees the continuity of film blowing. However, a decrease of the viscosity of the polyester mixture indicates that an addition of biodiesel damages performances of the polyester to some extent, resulting in an increased melting index and a decreased viscosity of the polyester mixture.

In addition, owing to effects of microorganism, illumination, radiation, atmosphere and contacted physical environment, a molding product prepared with the biodegradable polyester is relatively easy to age and degrade during storage and use, which hugely influences service performance of the product. A conventional method that solves the aging and the degradation of macromolecule material includes adding an antioxidant, a UV absorbent, a HALS stabilizer and the like into the material. For example, patent WO 2009/071475 discloses a mulching film of polyethylene which contains hydroxyphenyltriazines as the stabilizer. CN 103687902 introduces the UV absorbent and the HALS stabilizer, or a light stabilizer combining both, for providing the mulching film with UV stability. Although the above stabilizers can provide certain stabilization, they are definitely not satisfactory for a transparent mulching film, especially for that with a relatively thin wall thickness.

Besides, under a condition that the molding product prepared with the biodegradable polyester composition is digested with 95% ethanol, there will be a precipitate separating out of a surface of a film or a part, which thus influences a surface appearance property of the film or the part.

The present invention surprisingly finds by research that by adding a trace amount of a cyclic ester compound and cyclopentanone into the biodegradable polyester composition, an anti-oxidative property of the biodegradable polyester composition can be greatly enhanced, and meanwhile it guarantees that the biodegradable polyester composition has an excellent surface appearance property and enables the biodegradable polyester composition to have obviously improved film blowing properties. When a velocity of film blowing is relatively high, it presents good bubble stability as well as relatively small range of film thickness and guarantees the continuity of film blowing production.

SUMMARY OF THE INVENTION

An object of the present invention is to provide a biodegradable polyester composition. By adding a trace amount of a cyclic ester compound and cyclopentanone into the composition, the prepared biodegradable polyester composition may have excellent anti-thermal oxidative aging property, surface appearance property and bubble stability.

The present invention is realized by following technical solution:

a biodegradable polyester composition includes following components in parts by weight:

i) 60 to 100 parts of biodegradable aliphatic-aromatic polyester;

ii) 0 to 40 parts of polylactic acid;

iii) 0 to 35 parts of an organic filler and/or an inorganic filler;

iv) 0 to 1 part of a copolymer which contains epoxy group and is based on styrene, acrylate and/or methacrylate.

In particular, based on a total weight of the biodegradable polyester composition, a weight content of a cyclic ester compound having a structure shown as formula (I) is 100 ppm-950 ppm;

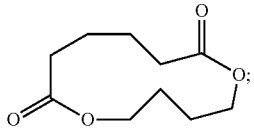

(I)

and based on the total weight of the biodegradable polyester composition, a weight content of cyclopentanone is 0.5 ppm-85 ppm.

Preferably, based on the total weight of the biodegradable polyester composition, the weight content of the cyclic ester compound is 160 ppm-750 ppm, preferably 210 ppm-540 ppm; and the weight content of cyclopentanone is 5 ppm-50 ppm, preferably 10 ppm-35 ppm.

Preferably, the biodegradable polyester composition includes the following components in parts by weight:

i) 65 to 95 parts of the biodegradable aliphatic-aromatic polyester;

ii) 5 to 35 parts of the polylactic acid;

iii) 5 to 25 parts of the organic filler and/or the inorganic filler;

iv) 0.02 to 0.5 part of the copolymer which contains epoxy group and is based on styrene, acrylate and/or methacrylate.

The biodegradable aliphatic-aromatic polyester is one or more of poly(butyleneadipate-co-terephthalate) (PBAT), poly(butylenesuccinate-co-terephthalate) (PBST) and poly (butylenesebacate-co-terephthalate) (PBSeT).

Addition of the cyclic ester compound helps to extend a service life of the biodegradable polyester composition. Cyclopentanone added into the biodegradable polyester plays a lubricant-like part. In research, the present invention found that controlling the content of the cyclic ester compound as 100 ppm-950 ppm and the content of cyclopentanone as 0.5 ppm-85 ppm in the biodegradable polyester composition, may not only guarantee the biodegradable polyester composition having good anti-thermal oxidative aging property, but also guarantee the prepared film or the prepared part having excellent surface appearance property. Besides, a lubrication degree of the film during a blow molding process of the biodegradable polyester may be improved. When the velocity of film blowing is 176 Kg/h, a range of a film thickness is less than 0.2 μm and a relative deviation of the film thickness is less than 1%. The bubble stability and continuity of film blowing are guaranteed.

However, if the content of the cyclic ester compound in the biodegradable polyester composition is too high, the cyclic ester compound will separate out of a surface of a film or a part under a condition of being digested with 95% ethanol, which influences the surface appearance property of the film or the part. If the content of cyclopentanone in the biodegradable polyester composition is too high, during a film blowing process at high velocity, a film is too lubricating to roll up well on a roll, and also it would result in an unstable film bubble. Therefore, based on the total weight of the biodegradable polyester composition, the weight content of the cyclic ester compound is preferably 160 ppm-750 ppm, and more preferably 210 ppm-540 ppm; and the weight content of cyclopentanone is preferably 5 ppm-50 ppm, and more preferably 10 ppm-35 ppm.

The organic filler is selected from a group consisting of natural starch, plasticized starch, modified starch, natural fiber and wood flour, or a mixture thereof. The inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

A route of acquiring the cyclic ester compound and cyclopentanone in the present invention may be by means of adding the cyclic ester compound and cyclopentanone directly during blending, extruding and processing the biodegradable polyester composition.

According to different needs of use, the biodegradable polyester composition according to the present invention may be further added with 0 to 4 parts of at least one of following substances: plasticizer, release agent, surfactant, wax, antistatic agent, pigment, UV absorbent, UV stabilizer and other plastic additives.

The plasticizer is one of or a mixture of two or more of citric esters, glycerol, epoxidized soybean oil and the like.

The release agent is one of or a mixture of two or more of silicone oil, paraffin, white mineral oil and Vaseline.

The surfactant is one of or a mixture of two or more of polysorbate, palmitate and laurate.

The wax is one of or a mixture of two or more of erucamide, stearamide, behenamide, beeswax and beeswax ester.

The antistatic agent is a permanent antistatic agent, specifically listed as one of or a mixture of two or more of PELESTAT-230, PELESTAT-6500 and SUNNICO ASA-2500.

The pigment is one of or a mixture of two or more of carbon black, black masterbatch, titanium dioxide, zinc sulfide, phthalocyanine blue and fluorescent orange.

The UV adsorbent is one or more of UV-944, UV-234, UV-531 and UV-326.

The UV stabilizer is one or more of UV-123, UV-3896 and UV-328.

The other plastic additives may be nucleating agent, antifogging agent and the like.

The biodegradable polyester composition according to the present invention may be used for preparing shopping bag, compost bag, mulching film, protective cover film, silo film, film strip, fabric, non-fabric, textile, fishing net, bearing bag, garbage bag and the like.

Compared to the prior art, the present invention has following beneficial effects:

In the present invention, by adding the cyclic ester compound and cyclopentanone into the composition and controlling the content of the cyclic ester compound in a range of 100 ppm-950 ppm and the content of cyclopentanone in a range of 0.5 ppm-85 ppm in the composition, not only the anti-thermal oxidative aging property of the biodegradable polyester composition may be greatly improved, at the same time the film prepared by blow molding or the part prepared by injection molding has little precipitate separating out of the surface and has excellent surface appearance property after being digested with 95% ethanol at 40° C. for 240 hours. In addition, the lubrication degree of film during the blow molding process of the biodegradable polyester may be improved. When the velocity of film blowing is 176 Kg/h, the range of film thickness is less than 0.2 μm and the relative deviation of film thickness is less than 1%. The bubble stability and the continuity of film blowing are guaranteed.

DETAILED DESCRIPTION OF THE PREFERRED EMBODIMENT

The present invention will be further described below by way of specific implementations, and the following embodiments are preferred implementations of the present invention, but the implementations of the present invention are not limited by the following embodiments.

In the embodiments of the present invention, PBAT is chosen as a component i); ADR4370 is chosen as a component iv); starch is chosen as an organic filler; talcum powder and calcium carbonate are chosen as inorganic filler; citric esters is chosen as a plasticizer; palmitate is chosen as a surfactant; and stearamide is chosen as a wax. The above-mentioned promoters, PBAT, ADR4370, PLA, cyclic ester compound and cyclopentanone are commercially available.

Embodiments 1-16 and Comparative Embodiments 1-4

According to formulae shown in Table 1, PBAT, PLA, ADR4370, organic fillers, inorganic fillers, promoters such as plasticizer, surfactant, wax and the like, a cyclic ester compound and cyclopentanone were mixed evenly and put into a single screw extruder. After being extruded at 140° C.-240° C. and prilled, the compositions were obtained. Data of performance tests is shown in Table 1.

Performance Evaluation Method:

(1) Evaluation Method for an Anti-Thermal Oxidative Aging Property of a Biodegradable Polyester Composition:

the biodegradable polyester composition was sealed in a non-vacuum aluminum foil bag. The aluminum foil bag was put in an air dry oven at 70° C. to perform a thermal oxidative aging test. Samples were taken every 3 days for testing a melting index (190° C./2.16 kg, according to ISO 1133). When the melting index of the sample was beyond a normal melting index range of the biodegradable polyester composition, it indicated that an obvious thermal oxidative aging degradation had occurred in the biodegradable polyester composition. A test time that the obvious thermal oxidative aging degradation occurred in the biodegradable polyester composition was recorded. The shorter the test time was, the poorer the anti-thermal oxidative aging property of the biodegradable polyester composition was indicated.

(2) Evaluation Method for a Surface Appearance Property of a Molding Product:

A 2 mm palette was injection molded and put into a solution of 95% ethanol at 40° C. for being digested for 240 hours, followed by being placed in a standard laboratory with an atmosphere temperature of (23±2) ° C. and a relative humidity of 45%-55%. After the palette was adjusted for 48 hours, ΔL, a variation of L-value of the palette before treatment and after treatment, was measured via a colorimeter. The greater the ΔL was, the more the precipitate separated out of the surface and the poorer the surface appearance property was.

(3) Evaluation Method for Bubble Stability of the Biodegradable Polyester Composition:

The bubble stability of the biodegradable polyester composition during film blowing was evaluated by a method of a range of a film thickness and a relative deviation of the film thickness:

The film thickness was measured via a screw micrometer: 10 measurement points were taken evenly on a film of 1 m*1 m to measure the film thickness.

The range of the film thickness was a difference value between a maximum thickness and a minimum thickness among the 10 measurement points.

The relative deviation of the film thickness was calculated according to the following formula:

$$\text{relative deviation of film thickness \%} = \frac{\text{range of film thickness}}{\text{average film thickness}} \times 100\%$$

wherein, the average film thickness was calculated as an arithmetic average of the thicknesses measured respectively at the 10 measurement points which were taken evenly on the film of 1 m*1 m.

(4) Determination Method for the Cyclic Ester Compound:

1.2000 g of the biodegradable polyester composition was weighed accurately, added into a 25 ml volumetric flask, and dissolved by adding chloroform. After the biodegradable polyester composition was dissolved completely, it was diluted to 25 ml. A peak area of the cyclic ester compound in the prepared solution was measured by a GC-MS test. The content of the cyclic ester compound in the biodegradable polyester composition was calculated according to the peak area of the cyclic ester compound in the prepared solution and a standard curve of the cyclic ester compound. The standard curve of the cyclic ester compound was calibrated by a solution of the cyclic ester compound/chloroform.

Models and parameters for GC-MS are as follows:
Agilent Technologies 7693 AutoSampler;
Agilent Technologies 5975C inert MSD with Triple-Axis Detector;
Chromatographic column: J&W 122-5532 UI: 350° C.: 30 m×250 µm×0.25 µm
Sample injection: front SS injection port He (helium)
Sample production: vacuum.

(5) Determination Method for Cyclopentanone:

1) Drawing a Standard Curve of Cyclopentanone:

Cyclopentanone/methanol solutions in concentrations of 0.0001 g/L, 0.001 g/L, 0.01 g/L, 0.1 g/L, 5.0 g/L, 10.0 g/L and 20.0 g/L were prepared, respectively. Peak areas of cyclopentanone in the cyclopentanone/methanol solutions in different concentrations were measured respectively by a static headspace method. The standard curve of cyclopentanone was drawn, with the peak area of cyclopentanone as an ordinate and the concentration of cyclopentanone as an abscissa.

2) Measurement of a Content of Cyclopentanone in the Biodegradable Polyester Composition:

Approximate 1.2000 g of biodegradable polyester composition was weighed accurately and put into a static headspace test flask; the peak area of cyclopentanone in the biodegradable polyester composition was measured by the static headspace method; and the content of cyclopentanone in the biodegradable polyester composition was calculated according to the peak area of cyclopentanone in the biodegradable polyester composition and the standard curve of cyclopentanone.

Instrument models and parameters for static headspace are as follows:
Agilent Technologies 7697 Headspace Sampler;
Agilent Technologies 7890A GC System;
Chromatographic column: J&W 122-7032: 250° C.: 30 m×250 µm×0.25 µm
Sample injection: front SS injection port $N_2$
Sample production: front detector FID.
Conditions for static headspace test are as follows:
Temperature:
Heater: 105° C.
Quantitative loop: 135° C.
Transmission line: 165° C.
Time:
Balance for sample bottle: 120 minutes
Duration for sample injection: 0.09 minute
GC circulation: 30 minutes.

TABLE 1

Test data of Comparative Embodiments 1-4 and Embodiments 1-16 (parts by weight)

| | Comparative Embodiment 1 | Comparative Embodiment 2 | Comparative Embodiment 3 | Comparative Embodiment 4 | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|---|---|---|
| PBAT | 84.1 | 84.1 | 84.1 | 84.1 | 100 | 84.1 | 84.1 | 84.1 | 84.1 | 84.1 | 67 | 66.5 |
| PLA | 10 | 10 | 10 | 10 | | 10 | 10 | 10 | 10 | 10 | 15 | 32 |
| starch | | | | | | | | | | | 17 | |
| talcum powder | 1.6 | 1.6 | 1.6 | 1.6 | | 1.6 | 1.6 | 1.6 | 1.6 | 1.6 | | |

TABLE 1-continued

Test data of Comparative Embodiments 1-4 and Embodiments 1-16 (parts by weight)

| | | | | | | | | | | | | |
|---|---|---|---|---|---|---|---|---|---|---|---|---|
| calcium carbonate | 3.5 | 3.5 | 3.5 | 3.5 | | 3.5 | 3.5 | 3.5 | 3.5 | 3.5 | | |
| ADR4370 | 0.3 | 0.3 | 0.3 | 0.3 | 0.3 | 0.3 | 0.3 | 0.3 | 0.3 | 0.3 | 0.3 | 0.5 |
| citric esters | | | | | | | | | | | 0.2 | |
| palmitate | | | | | | | | | | | | 0.5 |
| stearamide | 0.5 | 0.5 | 0.5 | 0.5 | | 0.5 | 0.5 | 0.5 | 0.5 | 0.5 | 0.5 | 0.5 |
| content of the cyclic ester compound (based on the whole composition)/ppm | 54 | 1152 | 100 | 160 | 100 | 215 | 282 | 316 | 408 | 437 | 495 | 540 |
| content of cyclopentanone (based on the whole composition)/ppm | 0 | 117 | 10 | 38 | 10 | 10 | 12 | 17 | 23 | 28 | 30 | 35 |
| time for thermal oxidative aging/day | 6 | 9 | 23 | 18 | 12 | 23 | 27 | 28 | 28 | 29 | 29 | 30 |
| ΔL | 0.08 | 1.06 | 0.19 | 0.40 | 0.09 | 0.19 | 0.22 | 0.27 | 0.29 | 0.34 | 0.35 | 0.36 |
| extrusion velocity at film blowing/Kg/h | 176 | 176 | 125 | 200 | 176 | 176 | 176 | 176 | 176 | 176 | 176 | 176 |
| range of film thickness/μm | 0.31 | 0.42 | 0.21 | 0.29 | 0.19 | 0.10 | 0.10 | 0.14 | 0.15 | 0.12 | 0.13 | 0.15 |
| relative deviation of film thickness/% | 1.5 | 2.1 | 1.12 | 1.93 | 0.92 | 0.42 | 0.43 | 0.55 | 0.61 | 0.59 | 0.62 | 0.69 |

| | Embodiment 9 | Embodiment 10 | Embodiment 11 | Embodiment 12 | Embodiment 13 | Embodiment 14 | Embodiment 15 | Embodiment 16 |
|---|---|---|---|---|---|---|---|---|
| PBAT | 84.1 | 84.1 | 84.1 | 84.1 | 84.1 | 84.1 | 84.1 | 84.1 |
| PLA | 10 | 10 | 10 | 10 | 10 | 10 | 10 | 10 |
| starch | | | | | | | | |
| talcum powder | 1.6 | 1.6 | 1.6 | 1.6 | 1.6 | 1.6 | 1.6 | 1.6 |
| calcium carbonate | 3.5 | 3.5 | 3.5 | 3.5 | 3.5 | 3.5 | 3.5 | 3.5 |
| ADR4370 | 0.3 | 0.3 | 0.3 | 0.3 | 0.3 | 0.3 | 0.3 | 0.3 |
| citric esters | | | | | | | | |
| palmitate | | | | | | | | |
| stearamide | 0.5 | 0.5 | 0.5 | 0.5 | 0.5 | 0.5 | 0.5 | 0.5 |
| content of the cyclic ester compound (based on the whole composition)/ppm | 160 | 174 | 671 | 750 | 100 | 135 | 839 | 950 |
| content of cyclopentanone (based on the whole composition)/ppm | 6 | 8 | 38 | 50 | 1 | 4 | 62 | 85 |
| time for thermal oxidative aging/day | 18 | 20 | 21 | 22 | 13 | 15 | 16 | 16 |
| ΔL | 0.40 | 0.38 | 0.61 | 0.65 | 0.69 | 0.71 | 0.75 | 0.79 |
| extrusion velocity at film blowing/Kg/h | 176 | 176 | 176 | 176 | 176 | 176 | 176 | 176 |
| range of film thickness/μm | 0.16 | 0.15 | 0.17 | 0.17 | 0.19 | 0.18 | 0.19 | 0.19 |
| relative deviation of film thickness/% | 0.81 | 0.74 | 0.83 | 0.84 | 0.98 | 0.89 | 0.90 | 0.95 |

It can be seen from Table 1 that, in the biodegradable polyester composition, when the content of the cyclic ester compound is 100-950 ppm and the content of cyclopentanone is 0.5-85 ppm, the biodegradable polyester composition has better anti-thermal oxidative aging property. Besides, after the biodegradable polyester composition is digested with 95% ethanol at 40° C. for 240 hours, ΔL is less than 0.80, which indicates that the composition has excellent surface appearance property. When the velocity at film blowing is 176 Kg/h, the range of the film thickness is less than 0.2 m and the relative deviation of the film thickness is less than 1%. It indicates that the composition has better bubble stability. However, in Comparative Embodiment 1, in which the content of the cyclic ester compound is less than 100 ppm and the content of cyclopentanone is 0, though ΔL of the composition is relatively low, the time for thermal oxidative aging of the composition is relatively short, the range of the film thickness is more than 0.2 µm, and the relative deviation of the film thickness is more than 1%. In Comparative Embodiment 2, in which the content of the cyclic ester compound is over 950 ppm and the content of cyclopentanone is over 85 ppm, ΔL is more than 1.0, the range of the film thickness is more than 0.2 m, and the relative deviation of the film thickness is more than 1%. It indicates that there is more precipitate separating out of the surface, and the surface appearance property and the bubble stability of the composition are poor. In Comparative Embodiment 3, in which the velocity at film blowing is below 176 Kg/h and in Comparative Embodiment 4, in which the velocity at film blowing is over 176 Kg/h, the range of the film thickness is more than 0.2 µm, the relative deviation of the film thickness is more than 1%, and the film bubble of the composition is relatively unstable either.

What is claimed is:

1. A biodegradable polyester composition, comprising following components in parts by weight:
   i) 60 to 100 parts of biodegradable aliphatic-aromatic polyester;
   ii) 0 to 40 parts of polylactic acid;
   iii) 0 to 35 parts of an organic filler and/or an inorganic filler;
   iv) 0 to 1 part of a copolymer which contains epoxy group and is based on styrene, acrylate and/or methacrylate;
   wherein, based on a total weight of the biodegradable polyester composition, a weight content of a cyclic ester compound having a structure shown as formula (I) is 100 ppm-950 ppm;

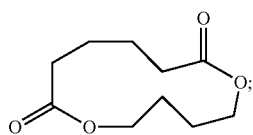

(I)

and based on the total weight of the biodegradable polyester composition, a weight content of cyclopentanone is 0.5 ppm-85 ppm.

2. The biodegradable polyester composition according to claim 1, wherein based on the total weight of the biodegradable polyester composition, the weight content of the cyclic ester compound is 160 ppm-750 ppm; and the weight content of cyclopentanone is 5 ppm-50 ppm.

3. The biodegradable polyester composition according to claim 1, wherein the following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler;
   iv) 0.02 to 0.5 part of the copolymer which contains epoxy group and is based on styrene, acrylate and/or methacrylate.

4. The biodegradable polyester composition according to claim 1, wherein the weight content of the cyclic ester compound is measured by following method: 1.2000 g of the biodegradable polyester composition is weighed accurately, added into a 25 ml volumetric flask, and dissolved by adding chloroform; after the biodegradable polyester composition is dissolved completely, the biodegradable polyester composition is diluted to 25 ml; a peak area of the cyclic ester compound in the prepared solution is measured by a GC-MS test; the content of the cyclic ester compound in the biodegradable polyester composition is calculated according to the peak area of the cyclic ester compound in the prepared solution and a standard curve of the cyclic ester compound; and the standard curve of the cyclic ester compound is calibrated by a solution of the cyclic ester compound/chloroform;

the weight content of cyclopentanone is measured by following method: 1.2000 g of the biodegradable polyester composition is weighed accurately and added into a static headspace test flask; a peak area of cyclopentanone in the biodegradable polyester composition is measured by a static headspace method; the content of cyclopentanone in the biodegradable polyester composition is calculated according to the peak area of cyclopentanone in the biodegradable polyester composition and a standard curve of cyclopentanone; and the standard curve of cyclopentanone is calibrated by a solution of cyclopentanone/methanol.

5. The biodegradable polyester composition according to claim 1, wherein the biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT).

6. The biodegradable polyester composition according to claim 1, wherein the organic filler is selected from a group consisting of natural starch, plasticized starch, modified starch, natural fiber and wood flour, and a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, and a mixture thereof.

7. The biodegradable polyester composition according to claim 1, wherein further comprising 0 to 4 parts of at least one of following substances: plasticizer, release agent, surfactant, wax, antistatic agent, pigment, UV absorbent, UV stabilizer and other plastic additives.

8. The biodegradable polyester composition according to claim 1, wherein the biodegradable polyester composition is sealed in a non-vacuum aluminum foil bag, and a time for thermal oxidative aging for putting the aluminum foil bag in an air dry oven at 70° C. for conducting a thermal oxidative aging test is equal to or more than 10 days.

9. The biodegradable polyester composition according to claim 1, wherein a ΔL value of the biodegradable polyester composition is less than 0.80 after being digested with 95% ethanol at 40° C. for 240 hours.

10. The biodegradable polyester composition according to claim 1, wherein when an extrusion velocity at film blowing of the biodegradable polyester composition is 176 Kg/h, a range of a film thickness is less than 0.2 μm and a relative deviation of the film thickness is less than 1%.

11. The biodegradable polyester composition according to claim 2, wherein the following components in parts by weight:
   i) 65 to 95 parts of the biodegradable aliphatic-aromatic polyester;
   ii) 5 to 35 parts of the polylactic acid;
   iii) 5 to 25 parts of the organic filler and/or the inorganic filler;
   iv) 0.02 to 0.5 part of the copolymer which contains epoxy group and is based on styrene, acrylate and/or methacrylate.

12. The biodegradable polyester composition according to claim 2, wherein the weight content of the cyclic ester compound is measured by following method: 1.2000 g of the biodegradable polyester composition is weighed accurately, added into a 25 ml volumetric flask, and dissolved by adding chloroform; after the biodegradable polyester composition is dissolved completely, the biodegradable polyester composition is diluted to 25 ml; a peak area of the cyclic ester compound in the prepared solution is measured by a GC-MS test; the content of the cyclic ester compound in the biodegradable polyester composition is calculated according to the peak area of the cyclic ester compound in the prepared solution and a standard curve of the cyclic ester compound; and the standard curve of the cyclic ester compound is calibrated by a solution of the cyclic ester compound/chloroform;
   the weight content of cyclopentanone is measured by following method: 1.2000 g of the biodegradable polyester composition is weighed accurately and added into a static headspace test flask; a peak area of cyclopentanone in the biodegradable polyester composition is measured by a static headspace method; the content of cyclopentanone in the biodegradable polyester composition is calculated according to the peak area of cyclopentanone in the biodegradable polyester composition and a standard curve of cyclopentanone; and the standard curve of cyclopentanone is calibrated by a solution of cyclopentanone/methanol.

13. The biodegradable polyester composition according to claim 3, wherein the weight content of the cyclic ester compound is measured by following method: 1.2000 g of the biodegradable polyester composition is weighed accurately, added into a 25 ml volumetric flask, and dissolved by adding chloroform; after the biodegradable polyester composition is dissolved completely, the biodegradable polyester composition is diluted to 25 ml; a peak area of the cyclic ester compound in the prepared solution is measured by a GC-MS test; the content of the cyclic ester compound in the biodegradable polyester composition is calculated according to the peak area of the cyclic ester compound in the prepared solution and a standard curve of the cyclic ester compound; and the standard curve of the cyclic ester compound is calibrated by a solution of the cyclic ester compound/chloroform;
   the weight content of cyclopentanone is measured by following method: 1.2000 g of the biodegradable polyester composition is weighed accurately and added into a static headspace test flask; a peak area of cyclopentanone in the biodegradable polyester composition is measured by a static headspace method; the content of cyclopentanone in the biodegradable polyester composition is calculated according to the peak area of cyclopentanone in the biodegradable polyester composition and a standard curve of cyclopentanone; and the standard curve of cyclopentanone is calibrated by a solution of cyclopentanone/methanol.

14. The biodegradable polyester composition according to claim 11, wherein the weight content of the cyclic ester compound is measured by following method: 1.2000 g of the biodegradable polyester composition is weighed accurately, added into a 25 ml volumetric flask, and dissolved by adding chloroform; after the biodegradable polyester composition is dissolved completely, the biodegradable polyester composition is diluted to 25 ml; a peak area of the cyclic ester compound in the prepared solution is measured by a GC-MS test; the content of the cyclic ester compound in the biodegradable polyester composition is calculated according to the peak area of the cyclic ester compound in the prepared solution and a standard curve of the cyclic ester compound; and the standard curve of the cyclic ester compound is calibrated by a solution of the cyclic ester compound/chloroform;
   the weight content of cyclopentanone is measured by following method: 1.2000 g of the biodegradable polyester composition is weighed accurately and added into a static headspace test flask; a peak area of cyclopentanone in the biodegradable polyester composition is measured by a static headspace method; the content of cyclopentanone in the biodegradable polyester composition is calculated according to the peak area of cyclopentanone in the biodegradable polyester composition and a standard curve of cyclopentanone; and the standard curve of cyclopentanone is calibrated by a solution of cyclopentanone/methanol.

15. The biodegradable polyester composition according to claim 2, wherein the biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT).

16. The biodegradable polyester composition according to claim 3, wherein the biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT).

17. The biodegradable polyester composition according to claim 11, wherein the biodegradable aliphatic-aromatic polyester is one or more of poly(butyleneadipate-co-terephthalate) (PBAT), poly(butylenesuccinate-co-terephthalate) (PB ST) and poly(butylenesebacate-co-terephthalate) (PBSeT).

18. The biodegradable polyester composition according to claim 2, wherein the organic filler is selected from a group consisting of natural starch, plasticized starch, modified starch, natural fiber and wood flour, and a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, and a mixture thereof.

19. The biodegradable polyester composition according to claim 3, wherein the organic filler is selected from a group consisting of natural starch, plasticized starch, modified starch, natural fiber and wood flour, and a mixture thereof; and the inorganic filler is selected from a group consisting of talcum powder, montmorillonite, kaolin, chalk, calcium carbonate, graphite, gypsum, conductive carbon black; calcium chloride, ferric oxide, dolomite, silicon dioxide, wollastonite, titanium dioxide, silicate, mica, glass fiber and mineral fiber, and a mixture thereof.

20. The biodegradable polyester composition according to claim 11, wherein the organic filler is selected from a group consisting of natural starch, plasticized starch, modified starch, natural fiber and wood flour, and a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, and a mixture thereof.

21. The biodegradable polyester composition according to claim 2, wherein further comprising 0 to 4 parts of at least one of following substances: plasticizer, release agent, surfactant, wax, antistatic agent, pigment, UV absorbent, UV stabilizer and other plastic additives.

22. The biodegradable polyester composition according to claim 3, wherein further comprising 0 to 4 parts of at least one of following substances: plasticizer, release agent, surfactant, wax, antistatic agent, pigment, UV absorbent, UV stabilizer and other plastic additives.

23. The biodegradable polyester composition according to claim 11, wherein further comprising 0 to 4 parts of at least one of following substances: plasticizer, release agent, surfactant, wax, antistatic agent, pigment, UV absorbent, UV stabilizer and other plastic additives.

24. The biodegradable polyester composition according to claim 2, wherein the biodegradable polyester composition is sealed in a non-vacuum aluminum foil bag, and a time for thermal oxidative aging for putting the aluminum foil bag in an air dry oven at 70° C. for conducting a thermal oxidative aging test is equal to or more than 10 days.

25. The biodegradable polyester composition according to claim 4, wherein the biodegradable polyester composition is sealed in a non-vacuum aluminum foil bag, and a time for thermal oxidative aging for putting the aluminum foil bag in an air dry oven at 70° C. for conducting a thermal oxidative aging test is equal to or more than 10 days.

26. The biodegradable polyester composition according to claim 12, wherein the biodegradable polyester composition is sealed in a non-vacuum aluminum foil bag, and a time for thermal oxidative aging for putting the aluminum foil bag in an air dry oven at 70° C. for conducting a thermal oxidative aging test is equal to or more than 10 days.

27. The biodegradable polyester composition according to claim 2, wherein a $\Delta L$ value of the biodegradable polyester composition is less than 0.80 after being digested with 95% ethanol at 40° C. for 240 hours.

28. The biodegradable polyester composition according to claim 4, wherein a $\Delta L$ value of the biodegradable polyester composition is less than 0.80 after being digested with 95% ethanol at 40° C. for 240 hours.

29. The biodegradable polyester composition according to claim 12, wherein a $\Delta L$ value of the biodegradable polyester composition is less than 0.80 after being digested with 95% ethanol at 40° C. for 240 hours.

30. The biodegradable polyester composition according to claim 2, wherein when an extrusion velocity at film blowing of the biodegradable polyester composition is 176 Kg/h, a range of a film thickness is less than 0.2 μm and a relative deviation of the film thickness is less than 1%.

31. The biodegradable polyester composition according to claim 4, wherein when an extrusion velocity at film blowing of the biodegradable polyester composition is 176 Kg/h, a range of a film thickness is less than 0.2 μm and a relative deviation of the film thickness is less than 1%.

32. The biodegradable polyester composition according to claim 12, wherein when an extrusion velocity at film blowing of the biodegradable polyester composition is 176 Kg/h, a range of a film thickness is less than 0.2 μm and a relative deviation of the film thickness is less than 1%.

\* \* \* \* \*